(12) United States Patent
Katoh

(10) Patent No.: US 8,161,729 B2
(45) Date of Patent: Apr. 24, 2012

(54) EXHAUST PURIFICATION SYSTEM FOR INTERNAL COMBUSTION ENGINE AND CONTROL METHOD OF THE EXHAUST PURIFICATION SYSTEM

(75) Inventor: Kenji Katoh, Shizuoka-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 757 days.

(21) Appl. No.: 12/280,564

(22) PCT Filed: Feb. 26, 2007

(86) PCT No.: PCT/IB2007/000457
§ 371 (c)(1),
(2), (4) Date: Aug. 25, 2008

(87) PCT Pub. No.: WO2007/099429
PCT Pub. Date: Sep. 7, 2007

(65) Prior Publication Data
US 2009/0019832 A1    Jan. 22, 2009

(30) Foreign Application Priority Data
Feb. 28, 2006    (JP) ................ 2006-052540

(51) Int. Cl.
*F01N 3/00*    (2006.01)
(52) U.S. Cl. ............ 60/277; 60/274; 60/276; 60/285
(58) Field of Classification Search .......... 60/274, 60/276, 277, 285; 701/103, 109; 123/672
See application file for complete search history.

(56) References Cited

U.S. PATENT DOCUMENTS

| | | | |
|---|---|---|---|
| 4,141,326 A * | 2/1979 | Wolber | 123/684 |
| 4,844,788 A | 7/1989 | Takahashi et al. | |
| 6,220,017 B1 * | 4/2001 | Tayama et al. | 60/277 |
| 6,684,628 B2 * | 2/2004 | Gobel et al. | 60/277 |
| 7,111,452 B2 * | 9/2006 | Miyoshi et al. | 60/285 |
| 7,694,512 B2 * | 4/2010 | Katoh et al. | 60/295 |
| 2006/0248876 A1 * | 11/2006 | Taxon | 60/275 |
| 2008/0041034 A1 * | 2/2008 | Hosoi | 60/276 |

FOREIGN PATENT DOCUMENTS

| | | |
|---|---|---|
| EP | 0 530 655 A2 | 3/1993 |
| EP | 1 298 304 A3 | 4/2003 |
| JP | 6-307271 | 11/1994 |
| JP | 2000-161107 | 6/2000 |
| JP | 2003-27924 | 1/2003 |
| JP | 2003-120383 | 4/2003 |

(Continued)

OTHER PUBLICATIONS

Japanese Office Action dated Nov. 26, 2008.
European Office Action dated Jan. 12, 2009.
European Office Action dated May 6, 2009.

(Continued)

*Primary Examiner* — Thomas Denion
*Assistant Examiner* — Diem Tran
(74) *Attorney, Agent, or Firm* — Finnegan, Henderson, Farabow, Garrett & Dunner, LLP

(57) ABSTRACT

An exhaust purification system for an internal combustion engine has a hydrogen concentration sensor (2) disposed upstream of a catalytic converter (1) in the engine exhaust system to detect a hydrogen concentration in the exhaust gas. An optimum combustion air-fuel ratio is then estimated based on the detected hydrogen concentration.

6 Claims, 2 Drawing Sheets

FOREIGN PATENT DOCUMENTS

| | | |
|---|---|---|
| JP | 2005-171982 | 6/2005 |
| JP | 2005-240712 | 9/2005 |
| JP | 2005-337127 | 12/2005 |
| WO | WO 2005/066472 | 7/2005 |
| WO | WO 2006/093357 | 9/2006 |
| WO | WO 2006/123564 | 11/2006 |

OTHER PUBLICATIONS

European Office Action issued on Sep. 24, 2009 for EP Appl. No. 07 733 905.9.

Notification of the First Office Action for JP 2007800015062 dated Feb. 5, 2010.

* cited by examiner

EXHAUST PURIFICATION SYSTEM FOR INTERNAL COMBUSTION ENGINE AND CONTROL METHOD OF THE EXHAUST PURIFICATION SYSTEM

CROSS-REFERENCE TO RELATED APPLICATIONS

This application is a national phase application of International Application No. PCT/IB2007/000457, filed Feb. 26, 2007, and claims the priority of Japanese Application No. 2006-052540, filed Feb. 28, 2006, the contents of both of which are incorporated herein by reference.

BACKGROUND OF THE INVENTION

1. Field of the Invention

The present invention relates to an exhaust purification system for an internal combustion engine and a control method of the exhaust purification system.

2. Description of the Related Art

As described in JP-A-H6-307271, an oxygen concentration sensor is disposed upstream of a catalytic converter in the engine exhaust system to detect an oxygen concentration in the exhaust gas and estimate the optimum air-fuel ratio based on the detected oxygen concentration.

When the air-fuel ratio is leaner than the stoichiometric ratio (i.e., when the air-fuel ratio increases), the oxygen concentration in the exhaust gas increases more noticeably. This ensures a more accurate estimation of the optimum air-fuel ratio. However, when the air-fuel ratio is richer than the stoichiometric ratio, the oxygen concentration in the exhaust gas decreases to almost zero and then shows less noticeable change than the air-fuel ratio does. This makes the accurate estimation of the optimum air-fuel ratio more difficult.

DISCLOSURE OF THE INVENTION

The present invention provides an exhaust purification system for an internal combustion engine and a method of controlling the exhaust purification system, which allow a more accurate estimation of the optimum air-fuel ratio when the ratio is richer than the stoichiometric ratio.

A first aspect of the invention relates to an exhaust purification system for an internal combustion engine. The exhaust purification system for an internal combustion engine has an upstream hydrogen concentration sensor disposed upstream of a catalytic converter in the engine exhaust system to detect the hydrogen concentration in the exhaust gas and estimate an optimum air-fuel ratio based on the detected hydrogen concentration.

In the exhaust purification system according to the first aspect of the invention, the catalytic converter is a three-way catalytic converter and a downstream hydrogen concentration sensor is disposed downstream of the three-way catalytic converter. Also, when a measured or an estimated temperature in the three-way catalytic converter is lower than a prescribed temperature, the degree of deterioration of the three-way catalytic converter may be estimated based on the difference between upstream and downstream hydrogen concentrations detected by the upstream and downstream hydrogen concentration sensors, respectively.

As described above, the catalytic converter is a three-way catalytic converter and the downstream hydrogen concentration sensor is disposed downstream of the three-way catalytic converter. When the measured or estimated temperature in the three-way catalytic converter is equal to or higher than the prescribed temperature and the air-fuel ratio in the exhaust gas entering the three-way catalytic converter is equal to or richer than a stoichiometric ratio, sulfur poisoning of the three-way catalytic converter may be determined based on the difference between the upstream and downstream hydrogen concentrations detected by the upstream and downstream hydrogen concentration sensors, respectively.

When it is determined that sulfur poisoning of the three-way catalytic converter has occurred, the measured or estimated temperature in the three-way catalytic converter may be controlled to remain equal or higher than the prescribed temperature, while the air-fuel ratio in the exhaust gas entering the three-way catalytic converter is controlled to remain equal to or richer than the stoichiometric ratio.

If it is determined that sulfur poisoning of the three-way catalytic converter has occurred, when the vehicle stops at idle and the measured or estimated temperature in the three-way catalytic converter remaining equal to or higher than the prescribed temperature, the air-fuel ratio in the exhaust gas entering the three-way catalytic converter may be controlled to be leaner than the stoichiometric ratio.

The exhaust purification system according to the first aspect of the invention may further include an oxygen concentration sensor disposed upstream of the catalytic converter in the engine exhaust system.

In the exhaust purification system according to the first aspect of the invention, when the air-fuel ratio is richer than the stoichiometric ratio, an estimation of the optimum air-fuel ratio may depend on the hydrogen concentration sensor.

When the air-fuel ratio is leaner than the stoichiometric ratio, an estimation of the optimum air-fuel ratio may depend on the oxygen concentration sensor.

The exhaust purification system according to the first aspect of the invention may have no catalytic converter disposed upstream of the upstream hydrogen concentration sensor.

A second aspect of the invention relates to a method of controlling the exhaust purification system for an internal combustion engine. The control method includes: detecting the hydrogen concentration contained in the exhaust gas upstream of a catalytic converter, disposed in the engine exhaust system; and estimating the optimum air-fuel ratio based on the detected hydrogen concentration.

In the exhaust purification system for an internal combustion engine according to the first aspect of the invention, when the air-fuel ratio is rich (as the air-fuel ratio decreases), the hydrogen concentration in the exhaust gas upstream of the catalytic converter increases more noticeably. Therefore, the detection of the hydrogen concentration in the exhaust gas with the upstream hydrogen concentration sensor disposed upstream of the catalytic converter in the engine exhaust system permits a more accurate estimation of the optimum air-fuel ratio, when the ratio is richer than the stoichiometric ratio.

In the exhaust purification system according to the first aspect of the invention, the catalytic converter may be a three-way catalytic converter and the downstream hydrogen concentration sensor may be disposed downstream of the three-way catalytic converter. With such configuration, in the three-way catalytic converter, a water vapor reforming reaction occurs in which hydrocarbons in the exhaust gas react with water vapor. In addition a water gas-shift reaction occurs in which carbon monoxide in the exhaust gas reacts with water vapor. However, hydrogen is formed as a product in both reactions. Therefore, when the measured or estimated temperature in the three-way catalytic converter is lower than the prescribed temperature, the difference between the upstream and downstream hydrogen concentrations detected by the upstream and downstream hydrogen concentration sensors, respectively, indicates the activity of the aforementioned water vapor reforming reaction and water gas-shift reaction. The less active these reactions are, the greater the extent of deterioration of three-way catalytic converter. Thus, the degree of deterioration of the three-way catalytic converter may be estimated.

In the exhaust purification system according to the first aspect of the invention, the catalytic converter may be a three-way catalytic converter and the downstream hydrogen concentration sensor may be disposed downstream of the three-way catalytic converter. With such configuration, when the measured or estimated temperature in the three-way catalytic converter is equal to or higher than the prescribed temperature and the air-fuel ratio in the exhaust gas entering the three-way catalytic converter is equal to or richer than the stoichiometric ratio, the three-way catalytic converter releases $SO_X$ if $SO_X$ is adsorbed therein. The $SO_X$ emissions react with hydrogen in the exhaust gas to form hydrogen sulfide. Therefore, in the three-way catalytic converter, hydrogen is formed in the described water vapor reforming reaction and water gas-shift reaction, while part of the hydrogen is consumed to form hydrogen sulfide. Thus, sensing the difference between the upstream and downstream hydrogen concentrations, detected by the upstream and downstream hydrogen concentration sensors, respectively, allows to estimate whether the hydrogen is consumed to form hydrogen sulfide. If consumption of hydrogen due to the formation of hydrogen sulfide is observed, it may be determined that sulfur poisoning of the three-way catalytic converter has occurred.

In the exhaust purification system according to the first aspect of the invention, when it is determined that sulfur poisoning of the three-way catalytic converter has occurred, the measured or estimated temperature in the three-way catalytic converter may be controlled to remain equal or higher than the prescribed temperature, while the air-fuel ratio of the exhaust gas entering the three-way catalytic converter may be controlled to remain equal to or richer than the stoichiometric ratio. With such configuration, if $SO_X$ having been stored in the three-way catalytic converter can be all emitted therefrom, this indicates no further formation of hydrogen sulfide in the three-way catalytic converter and accordingly, no hydrogen consumption. Therefore, it is determined that sulfur poisoning of the three-way catalytic converter has not occurred.

In the exhaust purification system according to the first aspect of the invention, if it is determined that sulfur poisoning of the three-way catalytic converter has occurred, if the vehicle stops at idle and the measured or estimated temperature in the three-way catalytic converter remains equal to or higher than the prescribed temperature, the three-way catalytic converter continues to produce $SO_X$ emissions. The $SO_X$ emissions react with hydrogen to form hydrogen sulfide, which is released to the air and possibly produces an offensive odor. Thus, the air-fuel ratio of the exhaust gas entering the three-way catalytic converter is controlled to be leaner than the stoichiometric ratio to reduce the $SO_X$ emissions from the three-way catalytic converter even if $SO_X$ is stored therein.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
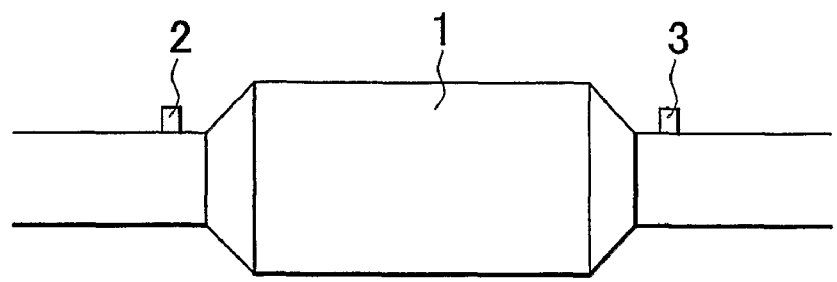
FIG. 1 is a schematic diagram of an exhaust purification system for an internal combustion engine according to one embodiment of the invention.

FIG. 1 is a schematic diagram of an exhaust purification system for an internal combustion engine according to one embodiment of the invention. A three-way catalytic converter 1 is disposed in the engine exhaust system. An upstream hydrogen concentration sensor 2 is disposed upstream of the three-way catalytic converter 1. A downstream hydrogen concentration sensor 3 is disposed downstream of the three-way catalytic converter 1.

In the embodiment of the invention, the internal combustion engine is predominantly designed to perform a homogenous combustion process with the stoichiometric ratio. The three-way catalytic converter 1 is designed to purity the exhaust gas burned at the stoichiometric ratio in a desired manner. However, under a high-load or high-speed operating condition, the air-fuel ratio may be enriched with respect to the stoichiometric ratio to increase engine output. Likewise, under a low-load or low-speed operating condition, the air-fuel ratio may be made leaner with respect to the stoichiometric ratio to reduce fuel consumption. Under these conditions, an $O_2$ storage capacity of the three-way catalytic converter 1 helps maintain the air-fuel ratio in the exhaust gas within the three-way catalytic converter 1 at around the stoichiometric ratio.

In general, the oxygen concentration sensor is disposed in the engine exhaust system to detect the oxygen concentration of the exhaust gas and estimate the optimum air-fuel ratio based on the detected oxygen concentration. However, the oxygen concentration in the engine exhaust system is almost zero when the air-fuel ratio is richer than the stoichiometric ratio. Under such condition, the oxygen concentration varies more slightly than the air-fuel ratio, which makes an accurate estimation of the optimum air-fuel ratio more difficult.

Figure 2:
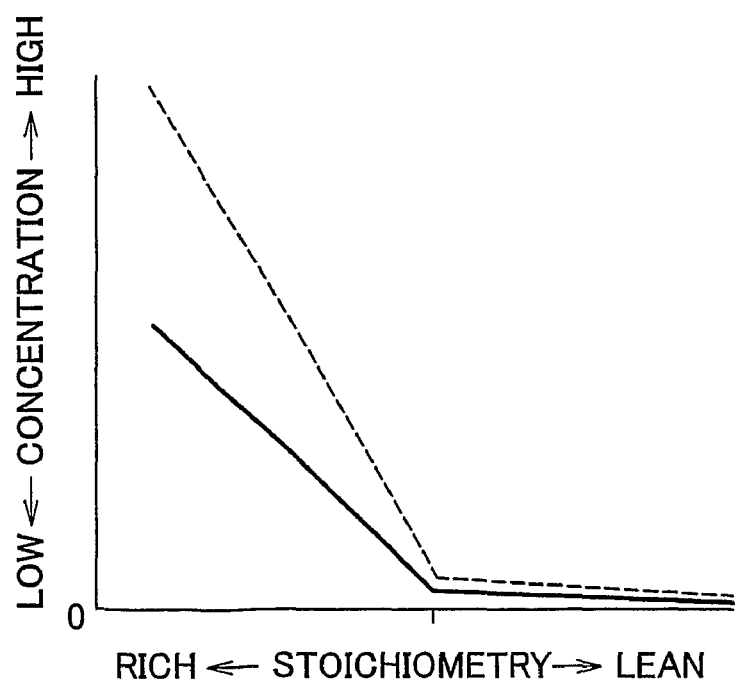
FIG. 2 is a graph illustrating changes in hydrogen and CO concentrations versus air-fuel ratio.

A solid line in the graph of FIG. 2 illustrates a relationship between air-fuel ratio and hydrogen concentration. As the graph shows, in the range of richer air-fuel ratio than the stoichiometric ratio, as the air-fuel ratio is richer (as the air-fuel ratio decreases), the hydrogen concentration increases more noticeably. Thus, the changes in hydrogen concentration are more apparent than the corresponding change in the air-fuel ratio. Therefore, in the embodiment of the invention, the optimum air-fuel ratio is estimated based on the hydrogen concentration in the exhaust gas, which is detected by the upstream hydrogen concentration sensor 2. In this embodiment, the optimum air-fuel ratio is more accurately estimated of particularly when the air-fuel ratio is rich. Based on this accurate estimation, the amount of fuel to be injected may be controlled to obtain the desired air-fuel ratio.

In contrast when the air-fuel ratio is lean, the hydrogen concentration shows more slight changes than the air-fuel ratio does. Even in a lean air-fuel ratio, the estimation of the optimum air-fuel ratio may be based on the hydrogen concentration detected by the upstream hydrogen concentration sensor 2. In addition to the upstream hydrogen concentration sensor 2, the oxygen concentration sensor is also disposed upstream of the three-way catalytic converter 1 to detect the oxygen concentration in the exhaust gas. The detected oxygen concentration is more noticeable when the air-fuel ration is leaner (as the air-fuel ratio increases). In other words, the oxygen concentration shows greater changes than the air-fuel ratio does. Thus, when the air-fuel ratio is lean, the estimation of the optimum air-fuel ratio may be based on the oxygen concentration detected by the oxygen sensor.

When the exhaust gas passes through a catalytic converter having an oxidation function, such as three-way catalytic converter and $NO_X$ storage reduction catalytic converter, a water vapor reforming reaction occurs in which hydrocarbons in the exhaust gas react with water vapor to form hydrogen, as shown in formula (1). In addition, a water gas-shift reaction occurs in which carbon monoxide in the exhaust gas reacts with water vapor to form hydrogen, as shown in formula (2).

$$CH_2 + H_2O \rightarrow CO + 2H_2 \qquad (1)$$

$$CO + H_2O \rightarrow CO_2 + H_2 \qquad (2)$$

It is therefore preferable to detect the hydrogen concentration in the exhaust gas, which has not yet passed through the catalytic converter, by the upstream hydrogen concentration sensor 2. Thus, in the embodiment of the invention, a catalytic converter is not disposed upstream of the upstream hydrogen concentration sensor 2.

$SO_X$ in the exhaust gas reacts with barium or potassium contained in the three-way catalytic converter 1 and the $SO_X$ is stored therein (hereinafter called as sulfur poisoning). This not only lowers the function of the noble metal catalyst contained in the three-way catalytic converter 1, thus increasing the temperature at which the activation occurs, but also lowers the $O_2$ storage capacity of ceria contained in the three-way catalytic converter 1.

The three-way catalytic converter 1, which stores the $SO_X$, releases $SO_X$ if the temperature in the three-way catalytic converter 1 is equal to or higher than a prescribed temperature and the oxygen concentration in the three-way catalytic converter 1 decreases. For example, under a high-load or high-speed driving condition, the high exhaust gas temperature causes the temperature in the three-way catalytic converter 1 to increase to or exceed the prescribed temperature. At the same time, the air-fuel ratio is equal to or richer than the stoichiometric ratio, under which the oxygen concentration in the exhaust gas decreases. Thereby, $SO_X$ is released automatically from the three-way catalytic converter 1.

Figure 3:
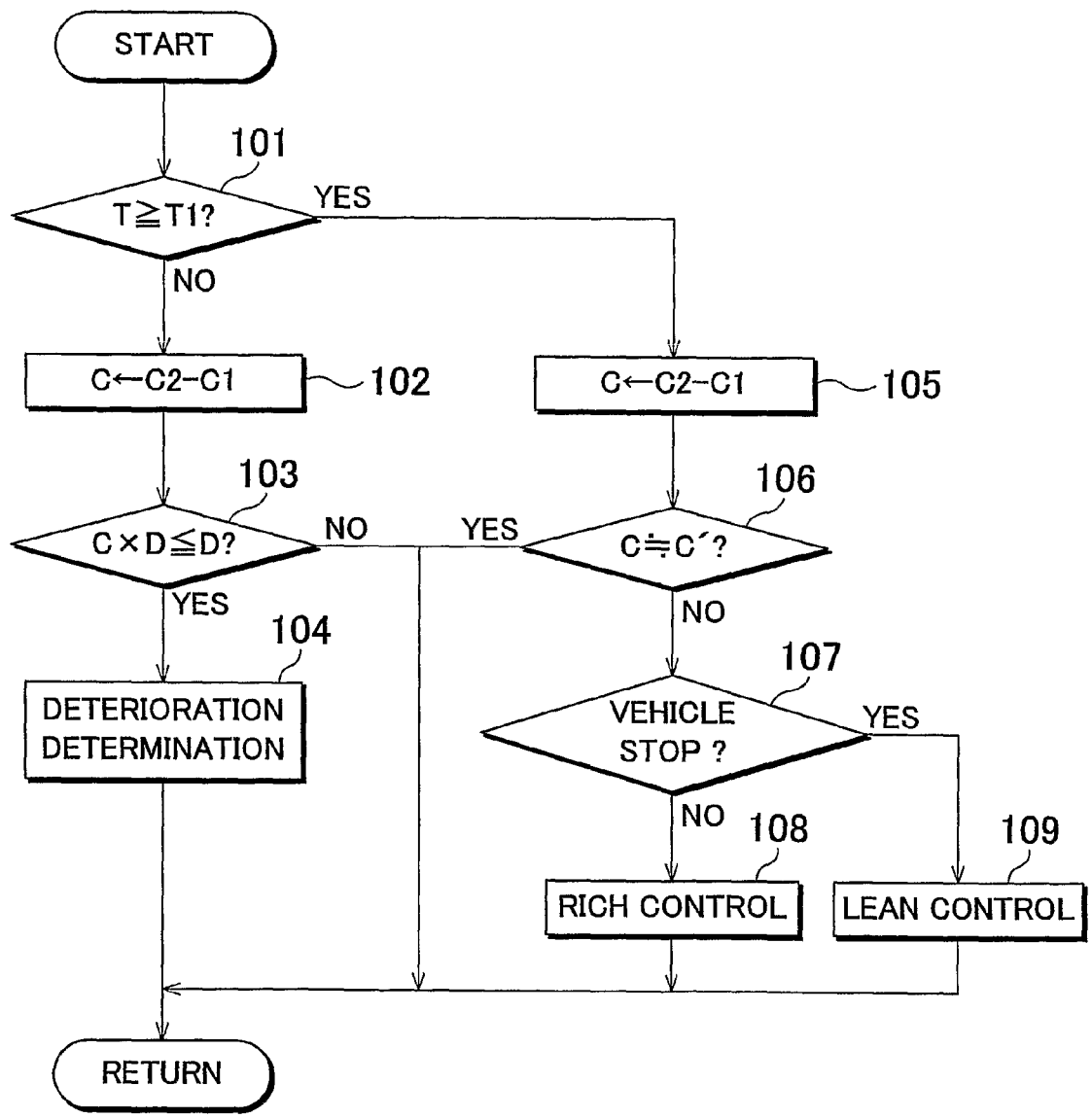
FIG. 3 is a flowchart of a control process for the exhaust purification system for an internal combustion engine according to the embodiment of the invention.

In the embodiment of the invention, the upstream and downstream hydrogen concentration sensors 2 and 3 are used to determine the extent of deterioration of the three-way catalytic converter 1 or to solve the sulfur poisoning in accordance with the flowchart shown in FIG. 3.

The process beings in step S101 to determine whether a measured temperature T (estimated temperature) in the three-way catalytic converter 1 is equal to or higher than a prescribed temperature T1. If the determination is false, the three-way catalytic converter 1 will not release $SO_X$. Then, the process goes to step S102 to calculate a difference C between the upstream and downstream hydrogen concentrations C1 and C2 detected by the upstream and downstream hydrogen concentration sensors 2 and 3, respectively. The difference C depends on the amount of hydrogen in the aforementioned water vapor reforming and water gas shift reactions.

If these reactions are active, the extent of deterioration of the three-way catalytic converter 1 is determined to be minimal. If not active, the extent of deterioration of the three-way catalytic converter 1 is significant. Then, the process goes to step S103 to determine whether a value, which is obtained by correcting the difference C between the upstream and downstream hydrogen concentrations C1 and C2 with a correction coefficient, k, is equal to or lower than a prescribed concentration D. If the degree of deterioration of the three-way catalytic converter 1 is determined to remain unchanged, as the exhaust gas contains more $CH_2$ and CO, that amounts of which are estimated based on the air-fuel ratio, or as the three-way catalytic converter 1 has a higher temperature, the water vapor reforming reaction and the water gas shift reaction are more active, and therefore the correction coefficient k decreases. A dotted line in FIG. 2 illustrates a relationship between air-fuel ratio and CO concentration.

The difference C corrected with the correction coefficient k is independent of the amounts of $CH_2$ and CO currently contained in the exhaust gas, and the current temperature of the three-way catalytic converter 1. The difference C is inversely proportional to the current degree of deterioration of the three-way catalytic converter 1. Thus, if the determination in step S103 is true, there is significant deterioration of the three-way catalytic converter 1. Furthermore, if the determination in step S103 is true multiple times consecutively, the three-way catalytic converter 1 may be determined to be deteriorated greatly.

In accordance with the flowchart shown in FIG. 3, the deterioration of the three-way catalytic converter 1 is determined directly from the oxidation-reduction reaction that occurs in the three-way catalytic converter 1, such as the water vapor reforming reaction and water gas-shift reaction. This ensures more accurate determination of the deterioration of the three-way catalytic converter 1, compared to the indirect determination from, for example, a decrease in $O_2$ storage capacity.

On the other hand, if the determination in step S101 is true, the process goes to step S105 to calculate the difference C between the upstream and downstream hydrogen concentrations C1 and C2 in the same manner as step S102. In step S305, under a high-load or high-speed driving condition, the three-way catalytic converter 1 has a high temperature, while the air-fuel ratio is equal to or richer than the stoichiometric ratio. Therefore, if sulfur poisoning of the three-way catalytic converter 1 has occurred, it produces $SO_X$ emissions.

The $SO_X$ emissions react with hydrogen to form hydrogen sulfide, as shown by the following formula (3).

$$SO_2 + 3H_2 \rightarrow H_2S + 2H_2O \qquad (3)$$

Then, the process goes to step S106 to determine whether or not the difference C between the upstream and downstream hydrogen concentrations C1 and C2, which is calculated in step S105, is approximately equal to a hydrogen concentration C' based on the amount of hydrogen formed by the water vapor reforming reaction and the water gas-shift reaction. The hydrogen concentration C' is estimated by taking into account the amounts of $CH_2$ and CO currently contained in the exhaust gas, the current temperature of the three-way catalytic converter 1, and the current degree of deterioration of the catalytic converter 1. The true determination in step S106 indicates that there is no hydrogen being consumption through the formation of hydrogen sulfide. In other words, it is determined whether the three-way catalytic converter 1 is not releasing $SO_X$.

If the determination in step S106 is true, it is determined that sulfur poisoning of the three-way catalytic converter 1 has not occurred. The process ends the determination in accordance with the flowchart, as shown in FIG. 3. Thus, the air-fuel ratio is not necessarily enriched or leaned, and the amount of oxygen stored in the three-way catalytic converter 1 does not excessively fluctuate, as will be discussed below.

In contrast, a false determination in step S106 indicates that hydrogen is being consumed to form hydrogen sulfide. In other words, it is determined that sulfur poisoning of the three-way catalytic converter 1 has occurred because to the release of $SO_X$. Then, in accordance with the flowchart, the process goes to step S107 to determine whether the vehicle has stopped. If the determination is false, that is, the vehicle is in motion, the process goes to step S108 to enrich the air-fuel ratio with respect to the stoichiometric ratio, so that the three-way catalytic converter 1 continues to release $SO_X$. However, hydrogen sulfide, which is formed while the vehicle is moving, does not enter the interior of the vehicle.

Nonetheless, when the vehicle stops immediately after the high-load or high-speed driving, the $SO_X$ emissions from the three-way catalytic converter 1 cause formation of hydrogen sulfide, which enters the interior of the vehicle. Thus, the driver and any other occupants may smell an offensive odor. Therefore, if the determination in step S107 is true, the process goes to step S109 to lean the air-fuel ratio to reduce $SO_X$ emissions. Thereby, hydrogen sulfide formation is less likely to occur.

In steps S102 and S105 of the flowchart, the upstream hydrogen concentration sensor 2 is designed to detect the upstream hydrogen concentration C1 in the three-way catalytic converter 1. Alternatively, should an optimum air-fuel ratio be estimated by means other than the above, such as oxygen sensor, the upstream hydrogen concentration C1 may be determined based on the optimum estimated air-fuel ratio. For example, when the air-fuel ratio is leaner than the stoichiometric ratio, the oxygen concentration sensor may be used to estimate the upstream hydrogen concentration C1.

While the invention has been described with reference to what are considered to be preferred embodiments thereof it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. An exhaust purification system for an internal combustion engine comprising:
    a three-way catalytic converter provided in an exhaust system of the internal combustion engine;
    an upstream hydrogen concentration sensor, disposed upstream of the catalytic converter, that detects a hydrogen concentration in the exhaust gas upstream of the catalytic converter; and
    a downstream hydrogen concentration sensor, disposed downstream of the catalytic converter, that detects a hydrogen concentration in the exhaust gas downstream of the catalytic converter,
    wherein an optimum combustion air-fuel ratio is estimated based on the detected upstream hydrogen concentration, and
    wherein when a measured or an estimated temperature of the catalytic converter is below a threshold temperature, a degree of deterioration of the catalytic converter is estimated based on the difference between the detected upstream hydrogen concentration and the detected downstream hydrogen concentration.

2. The exhaust purification system for an internal combustion engine according to claim 1, further comprising an oxygen concentration sensor, disposed upstream of the catalytic converter in the engine exhaust system, that detects an oxygen concentration in the exhaust gas.

3. The exhaust purification system for an internal combustion engine according to claim 2, wherein the optimum combustion air-fuel ratio is estimated based on the detected hydrogen concentration in the exhaust gas when a combustion air-fuel ratio is richer than the stoichiometric ratio.

4. The exhaust purification system for an internal combustion engine according to claim 2, wherein the optimum combustion air-fuel ratio is estimated based on the detected hydrogen concentration in the exhaust gas when a combustion air-fuel ratio is leaner than the stoichiometric ratio.

5. The exhaust purification system for an internal combustion engine according to claim 2, wherein the optimum air-fuel ratio is estimated based on the detected oxygen concentration, and the hydrogen concentration in the exhaust gas upstream of the catalytic converter is estimated based the estimated optimum combustion air-fuel ratio.

6. A control method of an exhaust purification system for an internal combustion engine comprising:
    detecting a hydrogen concentration contained in exhaust gas upstream of a three-way catalytic converter disposed in the engine exhaust system;
    estimating an optimum combustion air-fuel ratio based on the detected upstream hydrogen concentration; and
    detecting a hydrogen concentration contained in the exhaust gas downstream of the catalytic converter,
    wherein when a measured or an estimated temperature of the catalytic converter is below a threshold temperature, a degree of deterioration of the catalytic converter is estimated based on the difference between the detected upstream hydrogen concentration and the detected downstream hydrogen concentration.

* * * * *